United States Patent [19]

Williams et al.

[11] Patent Number: 4,560,144

[45] Date of Patent: Dec. 24, 1985

[54] FLUID COUPLING DEVICE

[75] Inventors: Rodger W. Williams; Charles W. Atwood; Lawrence J. Morgan, all of Nashville, Tenn.

[73] Assignee: Vxtra Corporation, 700 Division, Nashville, Tenn.

[21] Appl. No.: 710,961

[22] Filed: Mar. 12, 1985

Related U.S. Application Data

[63] Continuation-in-part of Ser. No. 607,453, May 7, 1984, abandoned.

[51] Int. Cl.[4] .............................................. F16K 31/00
[52] U.S. Cl. ................................... 251/344; 137/315; 137/616.7; 285/325; 604/119; 16/342
[58] Field of Search ................ 137/315, 614, 19, 616, 137/616.7, 861, 887; 128/910, 205.14; 74/527; 285/DIG. 22, 319, 325; 251/298, 304, 309, 312, 162, 163, 192, 341, 343–345, 352; 604/247, 248, 119, 283; 16/342

[56] References Cited

U.S. PATENT DOCUMENTS

| | | | |
|---|---|---|---|
| 494,549 | 4/1893 | Clement | 16/342 |
| 1,166,551 | 1/1916 | Simmons | 16/342 |
| 2,622,922 | 12/1952 | Schroeder | 16/342 |
| 3,033,226 | 5/1962 | Allen | 251/344 |
| 3,260,805 | 7/1966 | Pihl | 74/527 |
| 3,859,985 | 1/1975 | Eckhart | 251/344 |
| 4,418,944 | 12/1983 | Haines et al. | 604/119 |

Primary Examiner—Samuel Scott
Assistant Examiner—Noah Kamen
Attorney, Agent, or Firm—Holman & Stern

[57] ABSTRACT

Fluid coupling devices are disclosed for use in receptacles such as receptacles on surgical aspiration equipment for selectively connecting a fluid conduit in the receptacle with a flow passage formed through a coupling device. The coupling devices in accordance with the invention comprise a spindle member which is non-rotatably held in the receptacle and a body member rotatably mounted on the spindle member for movement between an open position in which communication is established between the flow conduit in the receptacle and the flow passage in the coupling device, and a closed position disconnecting the conduit from the flow passage. The body member has a cam insert member with a through bore for connecting the flow conduit with the flow passage. The spindle member is formed with a cam surface for urging the cam insert member outwardly when it is moved into registration with the flow conduit in the receptacle so that an annular sealing lip on the outer surface of the cam insert member is compressed around the flow conduit to form an effective seal. In one embodiment of the invention the flow passage through the coupling device is formed through the body member and in another embodiment of the invention the flow passage through the coupling device is formed axially through the spindle member.

27 Claims, 27 Drawing Figures

FLUID COUPLING DEVICE

RELATED APPLICATION

This application is a continuation-in-part of application Ser. No. 607,453 filed May 7, 1984, now abandoned.

BACKGROUND OF THE INVENTION

1. Technical Field

The present invention relates to selectively actuable fluid coupling devices and, more particularly, to an improved T-coupling which can be fabricated as a disposable unit and which provides reliable pressure sealing at all interfaces between moving parts.

2. Discussion of the Prior Art

Selectively actuable fluid couplings, and particularly selectively actuable T-couplings, have numerous practical and commercial applications. One such application is surgical aspiration. A prior art fluid coupling device which has been designed for surgical aspiration applications is disclosed in U.S. Pat. No. 4,418,944 (Haines, et al). The disclosure in that patent is expressly incorporated herein in its entirety by this reference for purposes of background information.

The fluid coupling device in the Haines, et al., patent includes a male member which is received in an open-sided generally cylindrical receptacle of a female member. The male member has a transversely extending flow passage adapted to be provided with tubes at either end to establish an aspiration path from the surgical site to an aspirator mechanism. The male member is selectively rotatable in the female member so that a longitudinal bore in the male member, which intersects the transverse flow path, can be selectively aligned with an opening in the receptacle for a bleed supply passage defined in the female member. In order to achieve a tight pressure seal about the bleed passage opening when the bleed supply passage and the bore are aligned, the cylindrical surface of the receptacle, opposite the bleed supply passage opening, is configured with a raised cam and an adjacent detent which cooperate with a cam surface on the male member to force the male and female members together about the bleed passage and bore interface. The absence of cam interaction for other mutual rotational positions of the male and female members minimizes frictional resistance to selective rotation of the male member in use. While this arrangement provides a tight seal and easily controlled rotation between the members, the configured portion of the receptacle surface is subject to wear from repeated use. Thus, while the male member may be disposable, the cam on the permanent female member may eventually wear down and reduce the effectiveness of the seal.

The Haines, et al., patent expresses concern about the occurrence of twisting in the tubes which are attached to the transverse flow passage, particularly as the male member is rotated in the receptacle. In order to prevent such twisting and the resultant working loose of the tubes, Haines, et al., slightly displace the axis of the transverse flow path from the axis of rotation for the male member within the receptacle. This has the effect of imparting somewhat of an arcuate movement (rather than a completely twisting movement) about the flow axis to the attached tubes as the male member rotates in the receptacle. While this improves reliability by reducing the likelihood of the tubes twisting off the male member fittings, the problem is not completely avoided. Specifically, although the transverse flow path axis is not coincident with the rotation axis, the rotation axis still passes through the flow path. A certain degree of twisting is, therefore, still produced, leaving the possibility, although somewhat lessened, that the tubes can twist off their fittings.

For surgical aspiration applications the bleed supply passage provides pressure relief, thereby controlling the degree of aspiration and releasing the aspirator from the surgical site without pulling on tissue which the working tip of the unit may contact. Haines, et al., describe the need for a check valve in the bleed supply passage to control the amount of bleed fluid delivered to the aspirator as a function of pressure in the aspirator line. Haines, et al., note that the use of such check valves in the small diameter surgical tubing is unreliable because the necessarily small valves tend to fail. A solution to this problem is not expressly discussed by Haines, et al., and one is left to assume that the check valve is to remain in the small diameter tube or is disposed in the bleed supply passage upstream of the interface between the bore and the bleed passage opening. In the latter case the check valve becomes part of the permanent or non-disposable equipment and is therefore subject to failure due to extended use.

OBJECTS AND SUMMARY OF THE INVENTION

It is therefore an object of the present invention to provide improved fluid coupling devices of the type described.

It is another object of the present invention to provide fluid coupling devices in which the camming arrangement for effecting a positive seal in one rotation position between two mutually rotative members is produced entirely within one of the members which may be disposable.

A further object of the present invention is to provide a rotatable fluid coupling device having a transverse flow passage which is adapted for connection at its ends to flow tubes, wherein the flow passage is completely displaced from the axis of rotation of the coupling device in order to substantially eliminate twisting of the flow tubes about the coupling device fittings.

It is still another object of the present invention to provide a fluid coupling device suitable for use in surgical aspiration applications wherein a reliable check valve is employed for the bleed supply passage and is located in a disposable portion of the coupling device.

In accordance with the present invention, at least in a first embodiment thereof, a fluid coupling device includes a body member having a transverse flow passage defined therethrough. A longitudinal bore, open at one end, is defined in the body member and intersects the transverse flow passage. Flow through the bore is selectively controlled by a spindle member rotatably disposed in a spindle-receiving hole defined transversely through the body member in spaced relation to the transverse flow passage and in perpendicular intersecting relation to the bore. A flow channel or conduit is defined transversely through the spindle so as to be selectively aligned with the two sections of the bore on opposite sides of the spindle member. Thus, the spindle member serves as a rotary valve assembled to the body member in order to control flow through the bore.

The open end of the bore is widened and receives an apertured resilient sealing insert having a rim which projects out from the bore opening and is adapted to seal an opening in a receptacle wall of the type described above in relation to the Haines, et al., patent. The spindle member has a cammed or flattened section of reduced radius against which the inner end of the sealing insert abuts in the closed mutual rotation position of the spindle and body members, in which position the flow conduit in the spindle is substantially perpendicular to the bore in the body member. When the spindle and body members are aligned, the unflattened large radius portion of the spindle member resiliently stresses the sealing insert to urge it outward toward the bore opening so as to provide a positive seal against the surface of a receptacle wall. Likewise, there is an absence of such outward stress on the sealing member as it is rotated in the receptacle toward the open flow position.

The spindle member is provided with radial extensions at its opposite ends which are adapted to engage transversely spaced arms in a receptacle with which the fluid coupling device is used. The spaced receptacle arms prevent rotation of the spindle member within the receptacle but permit the body member to be rotated between the arms. The spindle flow conduit may thereby be permanently aligned with the receptacle bleed passage to serve as a conduit therefrom through the bore when the body member is rotated to align the bore with the aligned bleed passage and spindle conduit. A suitable stop and a tactile position indicator are provided to assure proper positioning of the body member for the open or aligned position.

A duckbill check valve is disposed in the body member bore between the spindle and the transverse flow passage to permit flow only toward the transverse flow passage as a function of the pressure in that passage. The resilient duckbill valve also provides a seal at its upstream end against the spindle member. The required check valve function in the bleed path is thus served by an inexpensive yet reliable duckbill valve which is included as part of the disposable body member/spindle member assembly.

In a fluid coupling device constructed in accordance with the first embodiment of the invention, the camming action for pressing the sealing rim of the cam seat insert member into engagement around the receptacle opening when the coupling device is rotated between the closed and open positions is accordingly effected entirely within the device itself by movement of the cam seat insert around cam surfaces formed on the spindle member. Further, since the flow passage through the body member for the attachment of tubes at either end thereof, is spaced substantially from the axis of rotation of the body member, the tendency for the tubes to twist when the device is rotated, is also reduced.

For certain applications, it may not be necessary to have a check valve between the bleed passage the transverse flow passage through the coupling device. Accordingly, in a second embodiment of the invention, a fluid coupling device comprises a body member, spindle member, and cam seat insert member of generally similar character to the equivalent elements of the first embodiment, with a camming action for the cam seat insert member again being effected internally of the device by rotation of the cam seat insert member around cam surfaces on the spindle member, but in the second embodiment, the transverse flow passage is formed substantially axially through the spindle member rather than through the body member, with a port being provided in the wall of the spindle member for connecting the transverse flow passage to the receptacle opening via the cam insert member when the device is in open position, and with the ends of the spindle member being extended to provide tube fittings. This arrangement provides a simplified construction of body member absent the duck-bill check valve, receiving bore, and transverse flow passage, and has the added advantage of substantially eliminating any tendency for the associated tubes to twist or otherwise move when the device is opened and closed, since the spindle member, to which the tubes are attached, is held in a fixed, non-rotatable condition in the associated receptacle.

BRIEF DESCRIPTION OF THE DRAWINGS

These and other objects, features and many of the advantages of the present invention will be better understood from a reading of the following detailed description considered in connection with the accompanying drawings wherein like parts in each of the several figures are identified by the same reference numerals, and wherein.

DESCRIPTION OF THE PREFERRED EMBODIMENTS

Referring initially to FIGS. 1-20 of the accompanying drawings, a first embodiment fluid coupling device of the present invention includes a body member 10 and a cam valve spindle member 30. The body member includes a handle portion 11 at one end, a valving portion 12 at its opposite end and an intermediate portion 13. A transverse flow passage 14, in the form of a generally cylindrical through bore, extends transversely through intermediate portion 13 proximate handle portion 11. The intermediate portion 13 is transversely extended at both of its sides about passage 14 to define extension fittings 15 adapted for connection to respective plastic tubes or similar flow conduits. Substantially centrally of the length of flow passage 14 is a T-intersection 16 of that passage and a bore 17 extending generally perpendicular thereto. Bore 17 is defined through an opening 18 at the valving portion end of the body member, and terminates at T-intersection 16. The end of bore 17 near open end 18 is enlarged, in a generally oval-like configuration, relative to the major portion of the bore length which is generally cylindrical. A transversely extending spindle-receiving through hole 19 is defined through the valving portion 12 of the body member. Through hole 19 intersects and passes entirely through bore 17 in perpendicular relation. An annular shoulder 20 is defined in the wall of bore 17 in valving portion 12 between the through hole 19 and the T-intersection 16. Shoulder 20 faces open end 18 and thereby defines a cylindrical bore section of slightly increased diameter between the shoulder and the through hole 19.

A duckbill check valve 21 is inserted into bore 17 through open end 18 and includes a diametrically enlarged flange portion 22 which abuts shoulder 20. The shoulder thereby serves as a stop to limit insertion of the duckbill check valve 21 into bore 17 and thereby fix the axial position of the valve in the bore. Flow through the bore 17 must pass through the duckbill check valve which is made of a resilient sealing material and is of sufficient diameter to fill the bore section in which it resides. The duckbill or valving end 23 of the duckbill valve is at the opposite end from flange 22 and is oriented to permit flow only in a direction toward T-intersection 16. In the preferred embodiment, duckbill check valve 21 is made of medical grade silicon rubber having a durometer in the range of 40-50.

Figures 1, 3, 4:
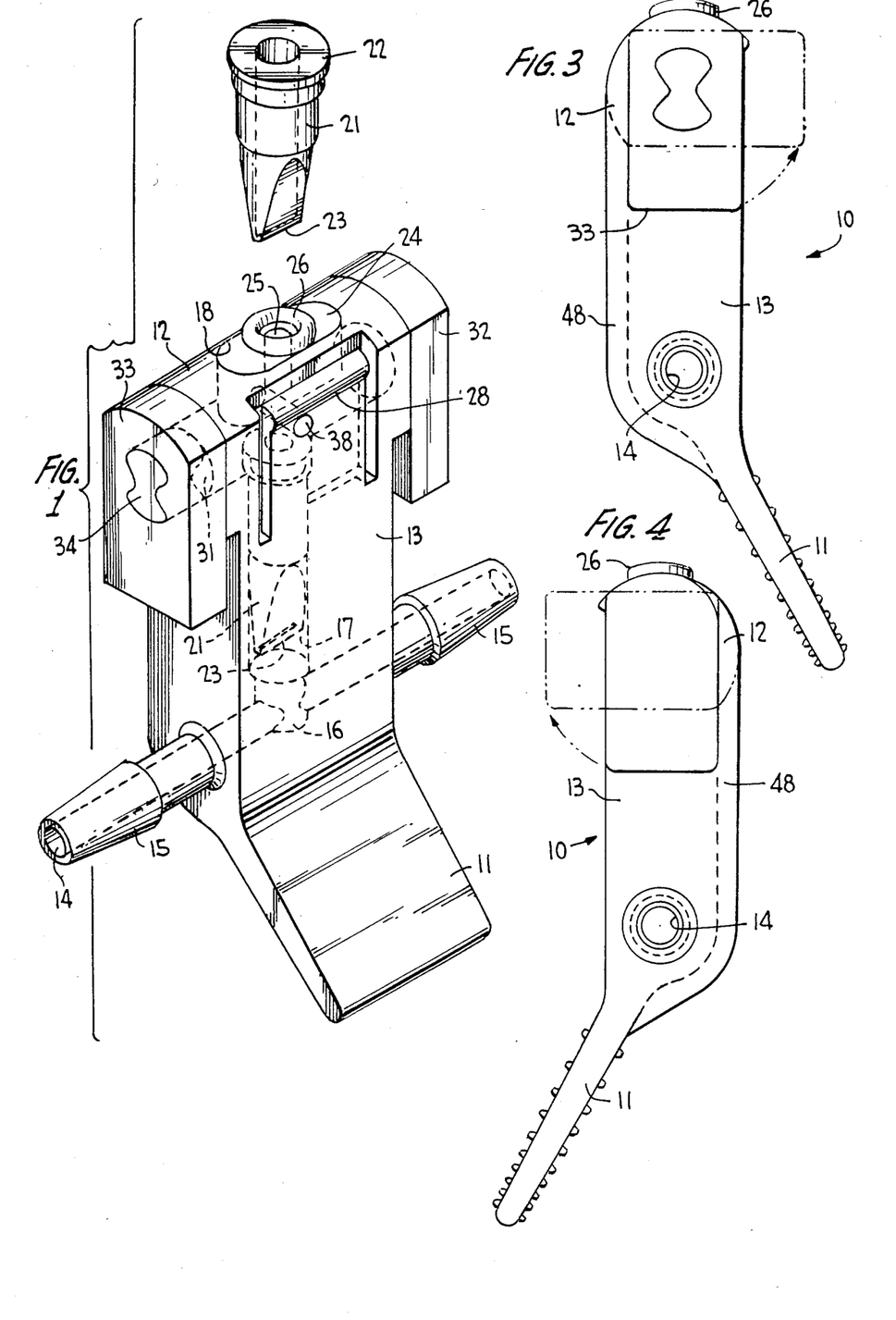
FIG. 1 is a view in perspective, and partially in phantom and exploded, of a first embodiment fluid coupling device constructed in accordance with the present invention.
FIG. 3 is a left side view in elevation of the device of FIG. 2.
FIG. 4 is a right side view in elevation of the device of FIG. 2.
Figures 2, 5, 6:
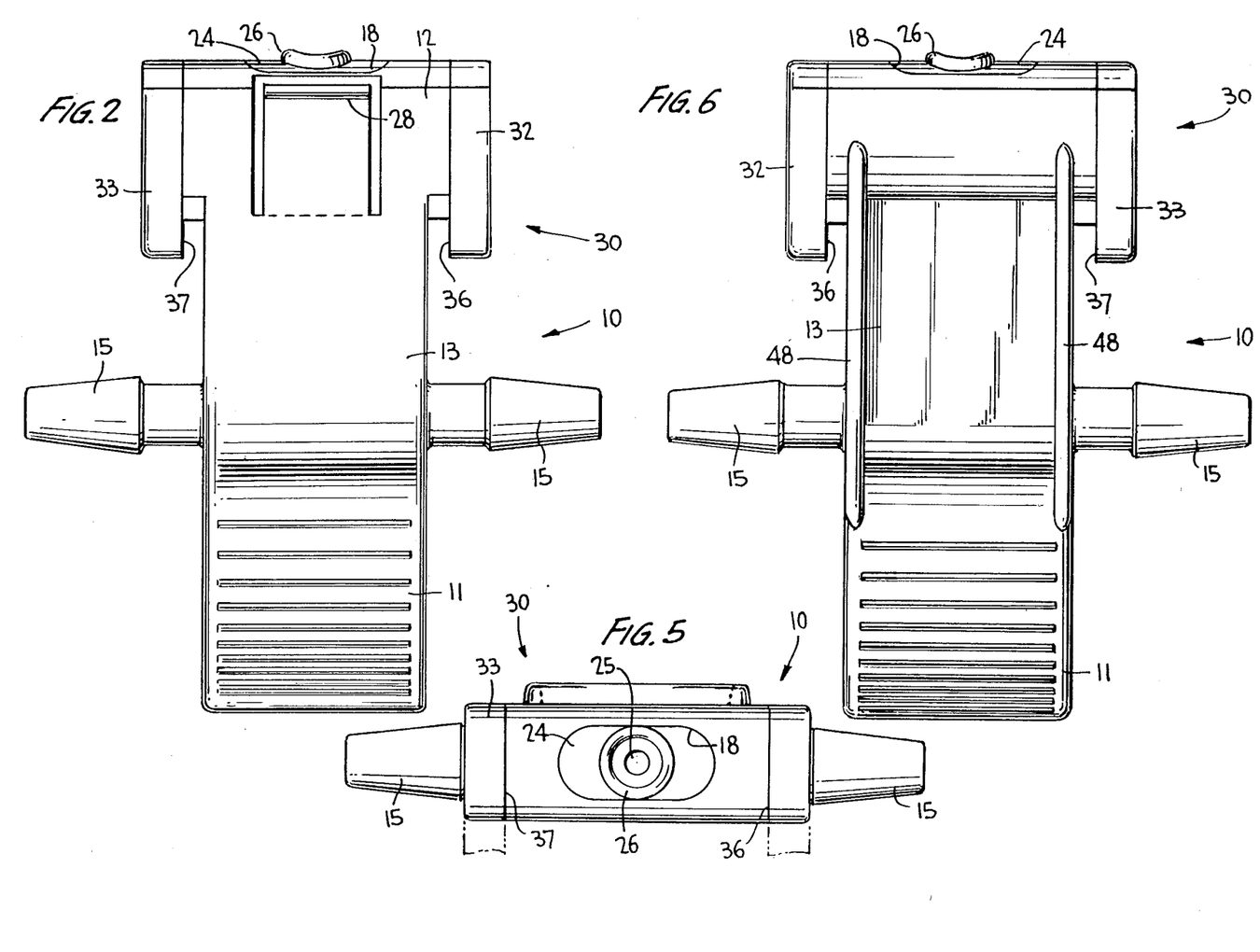
FIG. 2 is a front view in elevation of the fluid coupling device of FIG. 1.
FIG. 5 is a top view in plan of the device of FIG. 2.
FIG. 6 is a rear view in elevation of the device of FIG. 2.
Figures 7, 8, 9, 10, 11, 12:
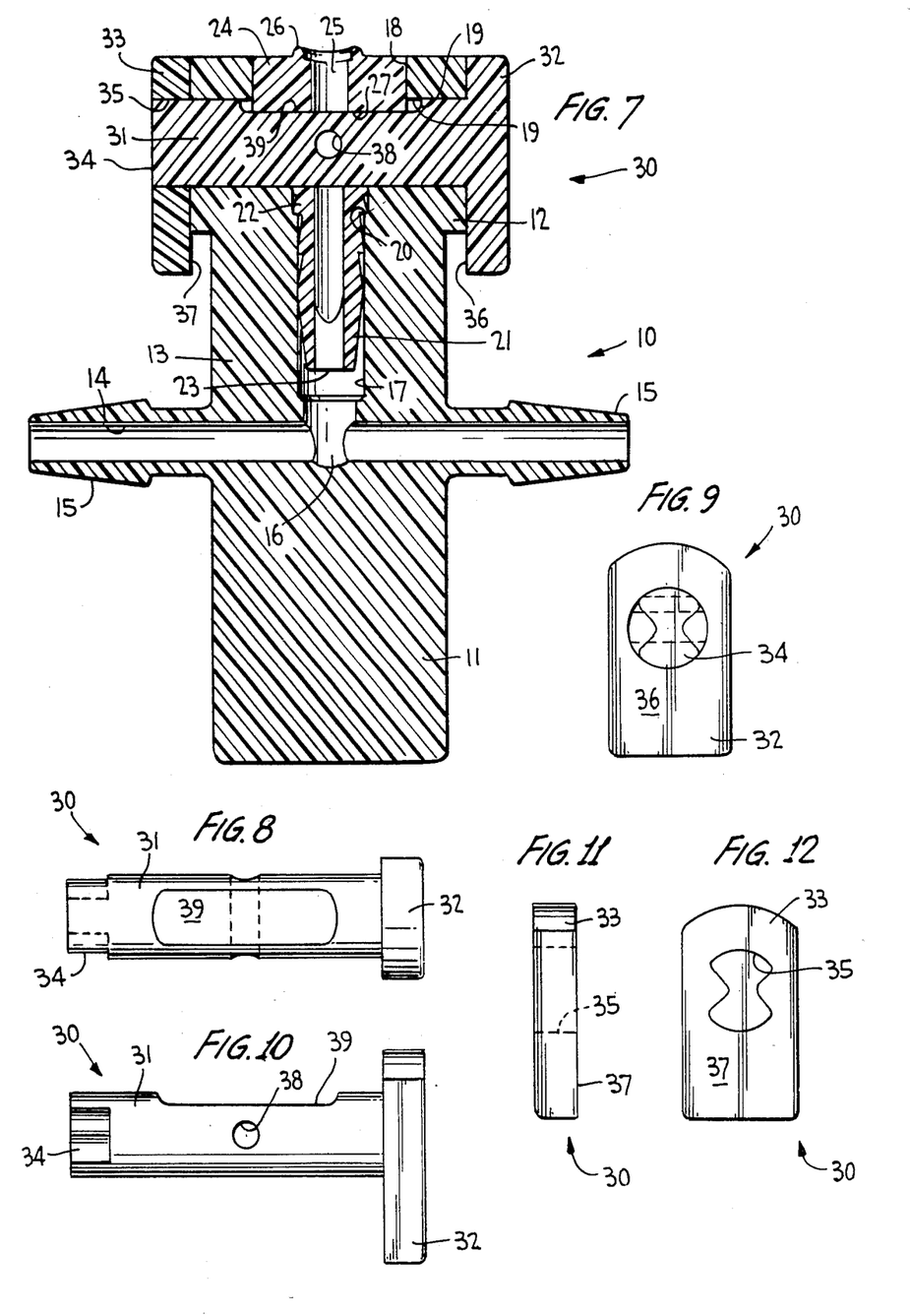
FIG. 7 is a view in section taken along lines 7—7 of FIG. 4.
FIG. 8 is a top view in plan of one part of the cam valve spindle portion of the device of FIG. 2.
FIG. 9 is an end view in elevation of the part in FIG. 8.
FIG. 10 is a front view in elevation of the part in FIG. 8.
FIG. 11 is a front view in elevation of another part of the cam coupling valve spindle.
FIG. 12 is a side view in elevation of the part of FIG. 11.

A resilient cam seat insert sealing member 24 is tightly secured in the enlarged open end of valving portion 12 of body member 10. Sealing member 24 has a transverse cross-sectional configuration which substantially matches the generally oval configuration at open end 18 of bore 17, so that member 24 may be wedged into the open end in sealing relation. The length of sealing member 24 is greater than the length of the widened open end 18 of bore 17 so that the sealing member extends a short distance into the transverse through hole 19. A passage or aperture 25 is substantially centrally defined through sealing member 24 in its length dimension, and is aligned with the section of bore 17 subsisting across through hole 19 from the sealing member. The exposed end of sealing member 24 includes a raised annular rim 26 which surrounds the opening for aperture 25. Rim 26 extends beyond the end profile of body member 10. In the preferred embodiment of the invention, resilient sealing member 24 is made of a relatively soft thermoplastic rubber having a durometer of 50-60, such as the material sold under the name Kraton by the Shell Oil Company.

The cam valve spindle member 30 includes an elongated generally cylindrical intermediate section 31 and two end members 32, 33 which project radially a substantial distance beyond the radius of the profile of intermediate section 31. Intermediate cylindrical section 31 is configured and sized to permit it to fit and slidably rotate in through hole 19 of body member 10. For purposes of fabrication, intermediate section 31 is preferably formed integrally with an end member (e.g., end member 32), and the other end member (e.g., end member 33) is secured by means of adhesive, ultrasonic welding, etc., to the opposite end of the intermediate section after the latter has been inserted through the spindle-receiving hole 19 in the body member. In order to facilitate securing the end member 33 to the intermediate section, the inserted end member 34 of the intermediate section is keyed to fit into a suitably provided slot or recess 35 in the presented surface of end member 33. In the illustrated embodiment, the keyed end 34 has a cross-section configuration (taken longitudinally of the body member 10) of an hour glass, and the slot 35 is similarly configured. The keyed end 34 projects out through hole 19 when the spindle member is fully inserted therein, and the facing surfaces 36 and 37 of end members 32 and 33, respectively, abut respective sides of valving portion 12 in rotatably slidable relation. Through hole 19 and spindle member 30 have central axes which coincide, as indicated at A, when the body and spindle members are thusly assembled, and determine the axis of rotation for the mutual rotation between the two members. It is to be noted that the axis of rotation does not pass through flow passage 14.

A flow conduit or hole 38 is defined through intermediate section 31 of the spindle member, perpendicularly intersecting axis A. Hole 38 is positioned to be aligned with aperture 25 and bore 17 for certain mutual rotational positions of the spindle and body members. The periphery of intermediate spindle section 31 is provided with a flattened cam portion 39 of reduced radius. Cam portion 39 is circumferentially spaced by 90' from flow hole 38 and presents a flat surface which is sufficiently large to abut the entire flat interiorly facing surface 27 of the cam seat insert sealing member 24. In other words, when the body and spindle members are mutually rotated to a closed or blocking position, with flow hole 38 oriented perpendicular to bore 17, the mutually presented surfaces 27 and 39 are flush with one another, and the sealing member is relatively unstressed longitudinally (i.e., in the direction perpendicular to rotation axis A). When the spindle and body members are in their open or free flow position, the full radial dimension of the spindle intermediate section 31 bears against the presented sealing member surface 27, thereby longitudinally stressing the sealing member and forcing sealing rim 26 outward. When the members are in rotational positions which are intermediate the open and closed positions, the longitudinal stress on sealing member 24 varies with the rotational position but is never as great as it is in the open position.

Figures 13, 14, 15, 16, 17, 18:
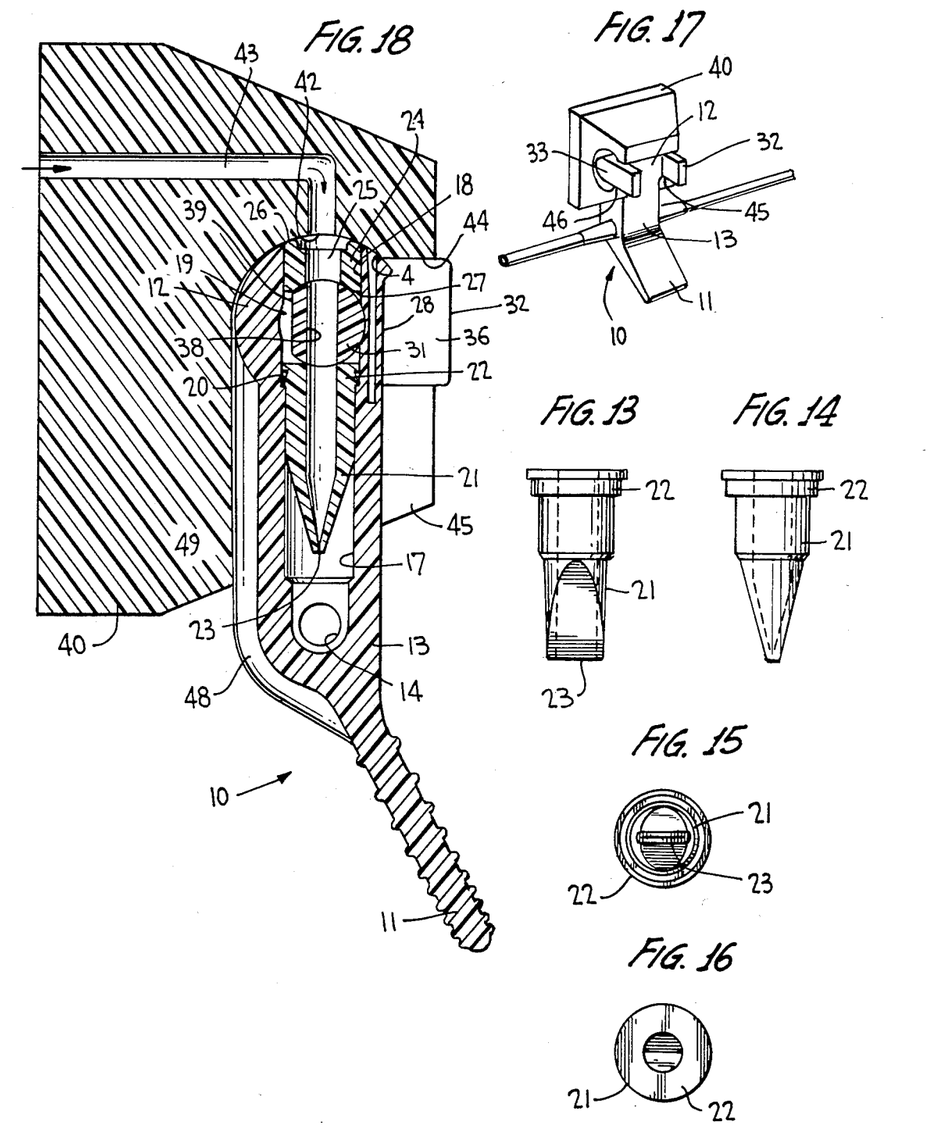
FIG. 13 is a front view in elevation of the duckbill check valve employed in the device of FIG. 2.
FIG. 14 is a side view in elevation of the duckbill check valve employed in the device of FIG. 2.
FIG. 15 is a bottom view in plan of the duckbill check valve employed in the device of FIG. 2.
FIG. 16 is a top view in plan of the duckbill check valve employed in the device of FIG. 2.
FIG. 17 is a view in perspective of the device of FIG. 1 inserted in a cooperative receptacle and shown in the open position.
FIG. 18 is a view in vertical section of the device and receptacle of FIG. 17.

The fluid coupling device described above is particularly suited for operation in conjunction with a receptacle member 40 having a generally cylindrical wall 41 partially surrounding a receptacle space. The receptacle space has a central axis B at its radial center, and has an opening 44 extending along the front of the receptacle. A flow opening 42 for a bleed supply passage 43 opens into the receptacle space, typically from the top of the space at a circumferential position displaced 90' from the center of opening 44. The receptacle wall 41 may be specially configured with a cam and detent (as described in the Haines, et al.) or not; the operation of the fluid coupling of the present invention is not affected. Beneath opening 44 is an open space defined between two transversely spaced and forwarding projecting arms 45 and 46. The space is wide enough to receive the full transverse dimension of intermediate portion 13 of body member 10 (not including, of course, the fittings 15). On the other hand, the members 32 and 33 of the spindle member are transversely spaced to generally correspond to the spacing between projecting receptacle arms 45 and 46.

In order to insert the fluid coupling device into receptacle 40, the body and spindle members are mutually rotated to the closed position wherein cam surface 39 abuts interior surface 27 of sealing member 24. In this position the elongated portions of end members 32 and 33 extend toward handle portion 11. Also in this position the valving section 12 of the body member, and the contained spindle member 30, may be inserted through opening 44 into the receptacle space bounded by wall 41. In addition, aperture 25 and bore 17 are misaligned by 90' with flow opening 42 for bleed supply passage 43. Flow hole 38, on the other hand, is aligned with opening 42 but is blocked from flow communication therewith by the body member in the closed position. The extended portion of the end members 32 and 33 are restrained against rotational motion in the receptacle by the top wall of opening 44 on one side and by the projecting arms 45 and 46 on the other side. Body member 10 is not so restrained, however, and can be selectively rotated downward between arms 45 and 46 through an angle of at least 90'. As the body member is thusly rotated, aperture 25 and bore 17 are rotated relative to flow hole 38 and bleed path opening 42. During this rotation relatively little longitudinal compressive stress is placed on sealing member 24 because of the reduced diameter of the cam surface 39; therefore, there is minimal frictional resistance to rotation of the coupling device in the receptacle. After a complete 90' rotation, aperture 25 and bore 17 are in complete alignment with flow 38 and bleed path opening 42 to permit bleed fluid to flow freely from passage 43 to the aspiration flow passage 14. In addition, the maximum radial dimension of the spindle intermediate section 31 bears against the sealing member 24, biasing that member outward to effect a positive seal about opening 42 by the sealing member rim 26.

Figures 19, 20:
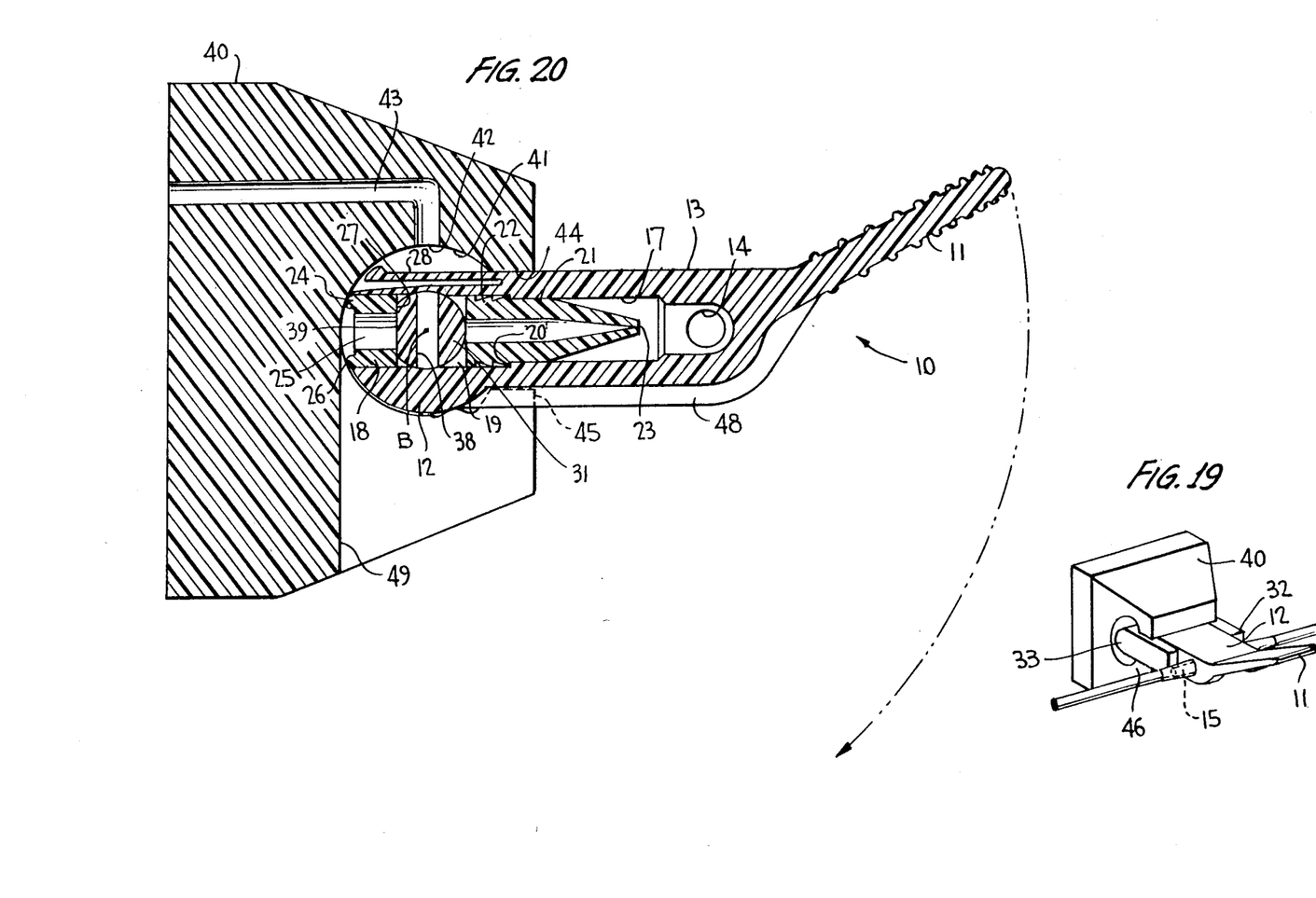
FIG. 19 is a view in perspective similar to FIG. 17 but showing the device in a closed position.
FIG. 20 is a view in section similar to FIG. 18 but showing the device in closed position.

A thin resiliently pivotable vane-like member 28 is provided as part of the forward surface of the valving portion 12 of body member 10. The portion of vane-like member 28 disposed proximate the end of the body member is spaced from the main part of the body member to provide the resiliently pivotable capability. The distal edge of vane-like member 28 is configured and positioned to resiliently snap as it passes the upper edge of the receptacle opening 44, thereby providing the user with a tactile indication that the aperture 25 and bore 17 are properly aligned with opening 42 and flow hole 38. In addition, rear stop projections 48 on body member 10 abut a portion 49 of the receptacle structure to prevent rotation of the body member beyond the desired open flow position.

The spindle member 30 is preferably made of a plastic material of high lubricity to minimize frictional resistance to rotation between the spindle member and each of body member 10, sealing member 24 and duckbill check valve 21. A polyoxymethylene copolymer, such as Celcon, manufactured by the Celanese Corporation, is a typically suitable material for this purpose.

Referring now to FIGS. 21–27 of the drawings, there is illustrated a second embodiment fluid coupling device of the invention generally indicated at 50, comprising a body member 52, a cam valve spindle member 54, and a cam seat insert sealing member 56, the coupling device being shown in FIGS. 21, 22, 25 and 26 in conjunction with a receptacle 60, which may be the same as receptacle 40 referred to in connection with the previous embodiment.

Figure 26:
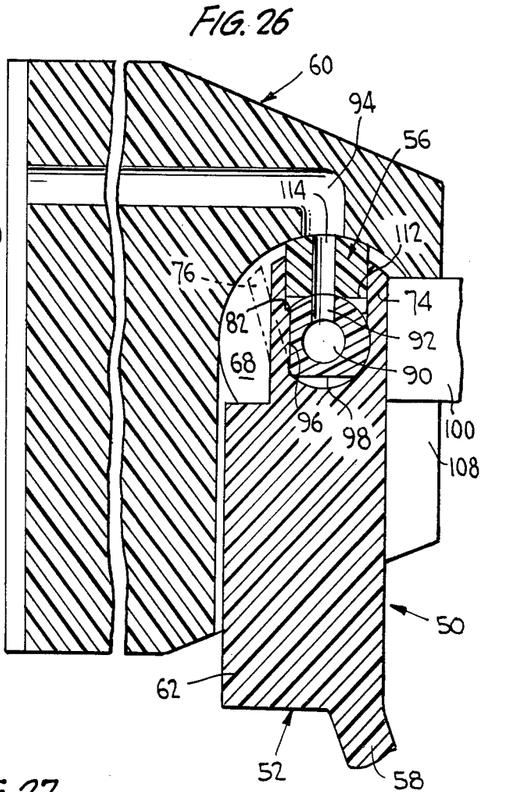
FIG. 26 is a view similar to FIG. 25 with the coupling device shown in the open position.

Body member 52, spindle member 54 and insert sealing member 56 are generally similar in character to the equivalent members in the first embodiment, and may be made of like materials. Body member 52, however, is of somewhat simpler construction than body member 10, by exclusion of the duck-bill check valve, its receiving bore, and the transverse flow passage which, as will be described, is in the second embodiment provided through the spindle member 54. Thus, body member 52 comprises a handle portion 58 at on end, a solid body portion 62 intermediate its ends, and a pocket-like valving or receiving portion 64 at its other end for receiving the spindle member and insert sealing member. Receiving portion 64 is defined between a pair of bearing sections 66, 68 integrally formed on the body member for rotatably mounting the body member on the spindle member, the bearing sections having circular internal bearing surfaces 70, 72, (FIG. 27) a front wall 74 connecting the bearing sections, and a back wall 76 separated from the bearing sections by slits 78, 80 which allow the back wall to flex somewhat as indicated in FIG. 26. Further, back wall 76 has a longitudinal shoulder 82 between a thicker base portion of the wall and a thinner top portion of the wall.

Figure 25:
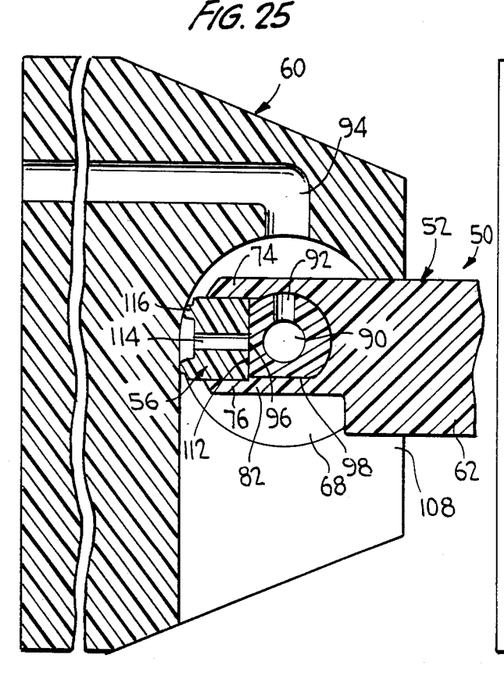
FIG. 25 is an enlarged sectional elevational view of the second embodiment coupling device and receptacle with the coupling device in the closed position.

Spindle member 54 has an intermediate portion 84 for rotatably receiving the body member, and extended end portions with tapering fittings 86, 88 forming tube connections. An axial bore 90 extends throughout the length of the spindle member to provide a transverse flow passage through the coupling device equivalent to flow passage 14 of the previous embodiment. A central opening or port 92 is provided in the spindle member for selectively connecting bore 90 with a bleed supply passage 94 in receptacle 60 via insert member 56, when the coupling device is in the open position, in similar manner to the previous embodiment. Intermediate portion 84 of the spindle member is of generally circular cross-section for rotatably receiving the bearing surfaces 70, 72 of the body member, but has a flattened cam portion 96 conforming to cam portion 39 of the first embodiment and which terminates short of the ends of the intermediate portion, and a further full-length flattened portion 98. As best seen in FIGS. 25 and 26, cam portion 96 is substantially parallel to the axis of port 92, while flattened portion 98 is disposed diametrically opposite the port. A first radially projecting end member 100 is integrally formed on one end of intermediate portion 84 of the spindle member, and a second like, but separate member 102 is provided for attachment, as by welding or adhesive, on the opposite end of the intermediate portion, after the spindle member and body member are assembled. End member 102 has a bore 104 with a flat 106 (FIG. 27) conforming to flattened portion 98 of the spindle member, ensuring connection of the end member to the spindle member at the proper angle. It is understood that end members 100 and 102 serve the same purpose as end members 32, 33 of the previous embodiment, in holding the spindle member against rotation when the coupling device is fitted in receptacle 60 by engaging between top wall 106 of the receptacle and projecting arms 108, 110.

The mutual configurations of body member 52 and spindle member 54, moreover, are such that the spindle member can only be inserted fully into the body member for assembly with the full-length flattened portion 98 aligned with back wall 76 of the body member, otherwise the full-diameter part of the end wall of the intermediate portion of the spindle member would foul against the thicker base portion of wall 76 and prevent full insertion of the spindle member. The mutual configuration of the body and spindle members requiring a unique assembly orientation ensures that when assembled in the respective members are in the relative configuration shown in FIGS. 23 and 25 which, when the coupling device is in use, is the closed position.

Figure 27:
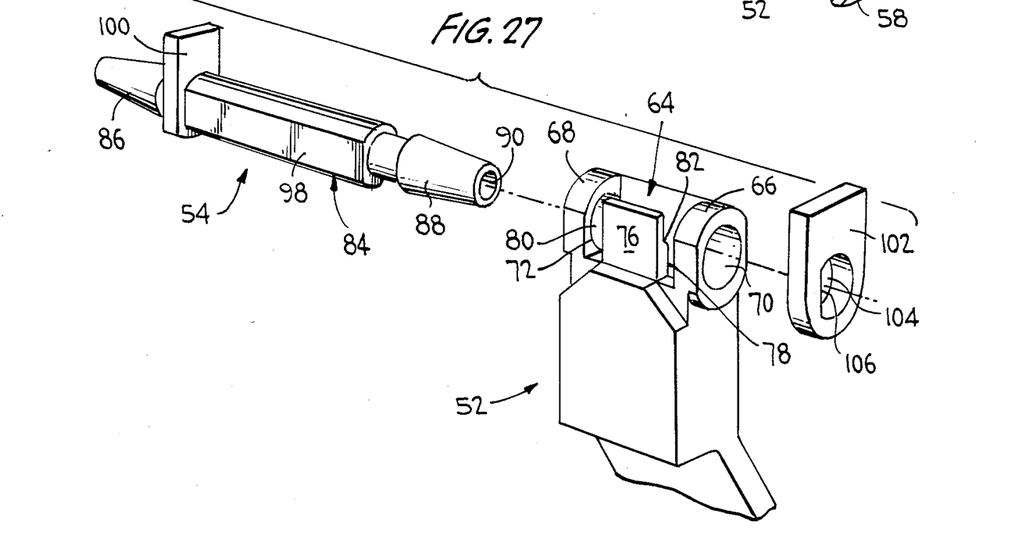
FIG. 27 is an exploded perspective view of the second embodiment coupling device.

After insertion of the spindle member in the body member as described above, end member 102 is suitably attached by adhesive or welding, and will be aligned with end member 100 due to the configuration of its flattened bore 104. The cam seat insert member 56 is then inserted in the top of receiving pocket 64 so that its base wall 112 rests on the flattened cam portion 96 of the spindle member. The cam seat insert member is a snug fit in pocket 64 and is provided with a through passage 114 and an annular sealing rim 116 as in the previous embodiment.

Figures 21, 22, 23:
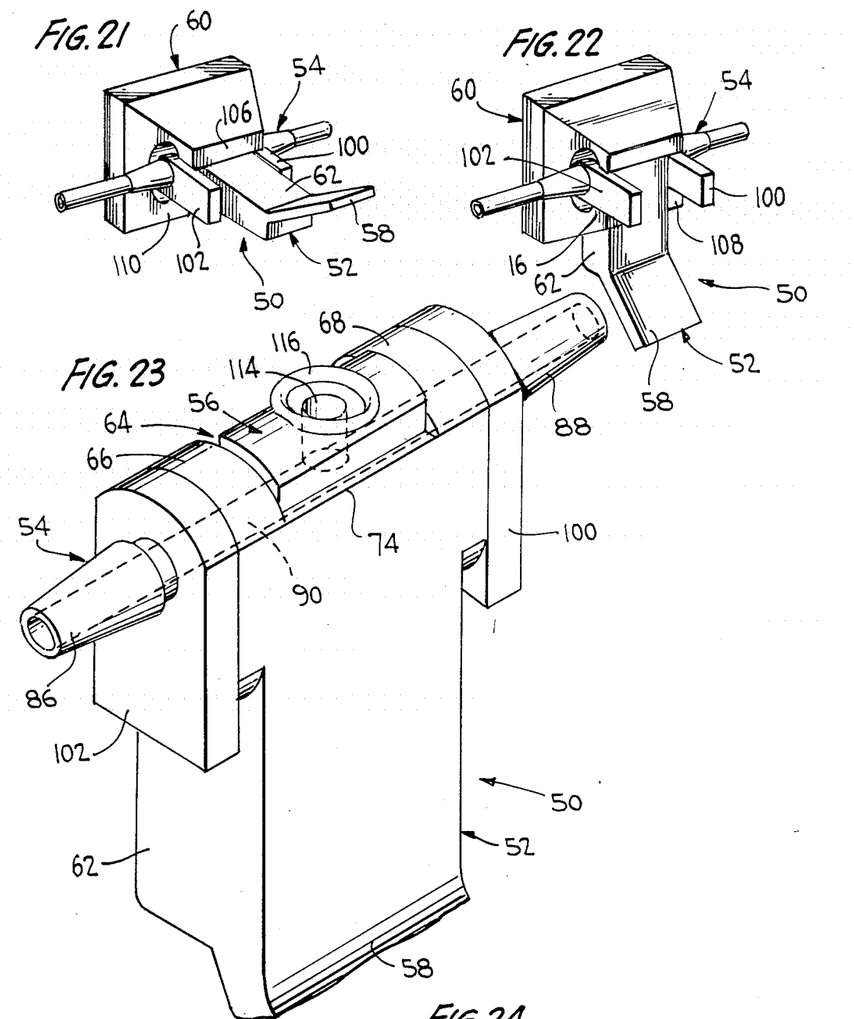
FIG. 21 is a view in perspective of a second embodiment fluid coupling device in accordance with the invention inserted in a cooperative receptacle and shown in the closed position.
FIG. 22 is a view similar to FIG. 21 with the coupling device shown in the open position.
FIG. 23 is an enlarged view in perspective and part broken away of the second embodiment fluid coupling device.
Figure 24:
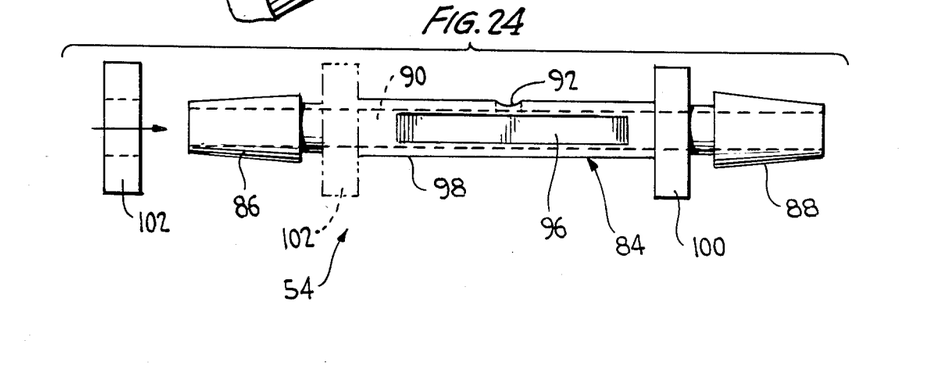
FIG. 24 is an exploded plan view of a cam valve spindle member portion of the device shown in FIG. 23.

The coupling device is inserted in receptacle 60 in the manner previously described, in the closed condition shown in FIGS. 21 and 25, so that the end members 100, 102 are received between top wall 106 and arms 108, 110 of the receptacle, thereby holding spindle member 54 against rotation, while body member 52 can be rotated around the spindle member to open and close the coupling device.

As in the previous embodiment, in the closed position, (FIG. 25) base wall 112 of the cam seat member is pressed against cam portion 96 of the spindle member. When the coupling device is to be opened, however, by pressing down on handle portion 58, moving the body member around the spindle member, cam seat member 56 rides onto the full diameter portion of the spindle member, thereby camming the cam seat member radially outwardly, so that in the open position (FIG. 26) in which the passage 114 is aligned with passage 94 in the receptacle and port 92 in the spindle member, thereby providing a flow path between passage 114 and the spindle bore 90, rim 116 is compressed around passage 94 to form an effective seal. During movement from the closed to the open position, back wall 76 of the body member flexes somewhat outwardly as indicated in FIG. 26, and then snaps into engagement against cam portion 96 of the spindle member to positively locate the body member in the open position and provide a tactile indication thereof. Likewise when the device is returned to the closed position and the cam insert member 56 is relaxed, wall 76 again flexes outwardly and snaps back into engagement with flattened portion 98 of the spindle member.

It will be understood that since bore 90 through the spindle member forms the flow passage through the coupling device, and since there is no rotation of the spindle member between the opened and closed positions of the device, there will be effectively no tendency for tubes attached to the opposite ends of the spindle member to twist or otherwise move when the device is opened and closed.

Having described several embodiments of a new and improved fluid coupling device constructed in accordance with the present invention, it is believed that other modifications, variations and changes will be suggested to those skilled in the art in view of the disclosure herein. It will be understood that all such variations, modifications, and changes are believed to fall within the scope of the present invention as defined in the appended claims.

What is claimed is:

1. For use in a receptacle having an inwardly facing wall open at one side and a fluid conductor terminating at an opening in said wall, a fluid coupling device having a flow passage formed therethrough, the coupling device being insertable in the receptacle through said open side and being movable when so inserted between an open position establishing communication between the fluid conductor and the flow passage, and a closed position disconnecting the fluid conductor from the flow passage, wherein the coupling device comprises a spindle member formed with an opening communicating with the flow passage, engagement means on the spindle member for engaging corresponding means on the receptacle in a manner precluding axial rotation of the spindle member, a body member rotatably mounted on the spindle member, the body member defining a receiving pocket communicating with a part of the spindle member containing said opening, a cam seat insert member received in said pocket, the cam seat insert member having an inner wall for engaging an outer surface of the spindle member, an outer wall projecting from the body member, a through passage extending between said walls, and a resilient annular sealing rim on the outer wall around said passage, and wherein said surface of the spindle member is formed as a cam surface for urging the cam seat insert member outwardly when the body member is rotated around the spindle member from the closed position to the open position aligning the through passage in the cam seat insert member with the respective openings in the spindle member and receptacle and compressing the sealing rim around the opening in the receptacle.

2. The fluid coupling device according to claim 1 wherein the flow passage is formed through the body member in substantially parallel relation to the longitudinal axis of the spindle member and has tube connector fittings at opposite ends thereof, the opening in the spindle member comprising a flow conduit formed through the spindle member substantially perpendicular to its axis, and the flow conduit formed through the spindle member communicating with the flow passage formed through the body member via a bore in the body member aligned with the flow conduit.

3. The fluid coupling device according to claim 2 further including a check valve inserted in said bore in the body member.

4. The fluid coupling device according to claim 1 wherein the spindle member has an axially extending through bore defining the flow passage, and the tube connector fittings at opposite ends thereof, the opening in the spindle member comprising a port in the wall thereof communicating with the axially extending through bore.

5. The fluid coupling device according to claim 4 wherein the body member has a pair of spaced bearing sections rotatably received on the spindle member, the bearing sections defining the receiving pocket therebetween, and a wall portion on the body member between but separated from the bearing sections, the wall portion engaging the cam surface of the spindle member for outward flexing when the body member is moved between the open and closed position, and for snapping into engagement against respective flattened portions of the cam surface in the respective opened and closed positions to positively locate the body member in the respective positions and provide a tactile indication thereof to a user.

6. A fluid coupling device comprising an elongate spindle member having a substantially axially extending flow passage formed therethrough with tube connection fittings at the respective ends thereof, a body member rotatably received on the spindle member between the connection fittings, the spindle member including a gripping means between the body member and at least one of the connection fittings for holding the spindle member in a manner precluding rotation thereof about its longitudinal axis while permitting rotary movement of the body member about the spindle member, the body member defining a receiving pocket communicating with a part of the outer surface of the spindle member, a port in the spindle member connecting said part of the outer surface with the flow passage, a cam seat insert member received in said pocket, the cam seat insert member having an inner face engaging said part of the outer surface of the spindle member, an outer face protruding from the pocket, a through passage connecting said inner and outer faces, and a resilient annular sealing lip on the outer face around the through passage, wherein said through passage in the cam seat insert member is axially aligned with said port in the spindle member and wherein said part of the outer surface of the spindle member comprises a cam surface for urging the cam seat insert member radially outwardly with respect to the spindle member when the body member is rotated to a position on the spindle member in which the through passage in the cam seat insert member is circumferentially registered with the port in the spindle member.

7. The fluid coupling device according to claim 6 wherein the cam surface on the spindle member comprises a part-circular portion containing said port and a flattened chordal portion disposed substantially in parallel with the axis of the port.

8. The fluid coupling device according to claim 7 wherein the cam surface on the spindle member includes a further flattened portion diametrically opposite said port, the body member including spaced bearing sections rotatably received on the spindle member, the bearing sections defining the receiving pocket therebetween, the body member further including a wall member between but separated from the bearing sections for outward flexing and for snapping into engagement with the respective flattened portions of the spindle member when the body member is rotated on the spindle member, the wall member when engaging the flattened chordal portion positively locating the through passage in the cam seat insert member in register with the port in the spindle member.

9. The fluid coupling device according to claim 8 wherein the flattened chordal portion extends only along a portion of a bearing section of the spindle member receiving the body member and the further flattened portion extends along the full length of said bearing section.

10. The fluid coupling device according to claim 9 wherein the wall member has a thickened base portion which engages the spindle member upon attempted insertion of the spindle member through the bearing sections of the body member unless the further flattened portion of the spindle member is aligned with the thickened base portion.

11. The fluid coupling device according to claim 9 wherein the gripping means comprises a first radially enlarged member on the spindle member at one end of the bearing section, and a second radially enlarged member for securing on the spindle member at the other end of the bearing section in alignment with the first radially enlarged member when the spindle member has been fully inserted through the bearing sections of the body member as aforesaid.

12. The fluid coupling device according to claim 6 wherein the body member is rotatably received on the spindle member toward one end of the body member the other end of the body member is formed as a handle for rotatably moving the body member around the spindle member.

13. The coupling device according to claim 6 wherein the body member and spindle member are formed as disposable plastic moldings and the cam insert member is formed of a resilient rubber-like composition.

14. A fluid coupling device comprising:
 a body member having a flow passage defined therethrough, a bore defined therein in intersecting relation with said flow passage, and a spindle-receiving through hole defined therethrough in intersecting relation with said bore and having a longitudinal axis; and
 a spindle member disposed in said through hole for rotational movement relative to said body member about said longitudinal axis, said spindle member having a flow conduit defined therein which is aligned with said bore in one mutual rotational position of said spindle and body members to permit flow communication across said through hole in said bore, said flow conduit being misaligned with said bore in a second mutual rotational position of said spindle and body members to prevent flow communication across said through hole in said bore;
 said bore terminating at one end in an opening in said body member, said flow passage being displaced from said longitudinal axis, and said spindle-receiving through hole being positioned to intersect said bore at a location between said opening and the intersection between said bore and said flow passage, whereby flow between said opening and said flow passage is permitted across said through hole in said one mutual rotational position and is blocked by said spindle member in said second mutual rotational position;

duckbill check valve means disposed in said bore between said through hole and said flow passage for permitting flow through said bore in only one direction;

said duckbill check valve means being oriented such that said one direction is toward said flow passage from said through hole;

said through hole being generally cylindrical, said spindle member being generally cylindrical to permit slidable rotation within said through hole, and said spindle member including a radially reduced section positioned axially on said spindle member so as to reside in said bore and positioned angularly on said spindle member so as to face generally toward said opening in said second rotational position of said spindle and body members and to face at an angle with respect to said opening in said one rotational position of said spindle and body members, said device further comprising a resilient insert sealing member made of resilient fluid-sealing material disposed in said opening and having an aperture extending therethrough in alignment with said bore, said insert sealing member having an outer rim portion surrounding said aperture and projecting out of said opening, said sealing insert member further including an inner end disposed in slidable fluid-sealing contact about said aperture with said spindle member, said aperture being aligned with said flow conduit in said one mutual rotational position, and wherein the inner end of said insert sealing member contacts said radially reduced section of said spindle member in said second rotational position of said spindle and body members and is urged axially outward from said opening by said spindle member in said one rotational position of said spindle and body members.

15. The fluid coupling device according to claim 14 further comprising a receiving member having a receptacle open at one side to receive said body member, said receptacle having a generally cylindrical radially-inward-facing wall defined about a further axis and along which said body member and said rim are rotationally slidable, said receptacle including projection means for engaging one of said spindle and body members to prevent rotation of said one member within said receptacle, thereby permitting rotation of the other of said body and spindle members relative to said receptacle when said body member is rotated relative to said spindle member, said receiving member having a flow conductor defined therein opening into said receptacle through said radially-inward-facing wall and positioned to be aligned with said aperture in said one rotational position of said body and spindle members.

16. The fluid coupling device according to claim 15 wherein said body member further includes a thin flexible vane-like member positioned to resiliently snap beyond said generally cylindrical radially-inward facing wall and through said open one side when said body member is rotated to said one rotational position while in said receptacle to thereby provide the user with a tactile indication that the body member is in said one position.

17. The fluid coupling device according to claim 15 wherein said spindle member includes two radially enlarged ends, and wherein said receptacle includes two axially spaced arms at said open one side which correspond to said projection means, said two ends being positioned to engage said two arms, respectively, to prevent mutual rotation between said spindle member and said receptacle.

18. The fluid coupling device according to claim 17 wherein said body member includes a handle portion disposed between said two enlarged ends and between said two arms to permit said handle member to be rotated with said body member through the space between said arms when said body member is rotated to said one rotational position.

19. A fluid coupling device comprising:

a body member having a flow passage defined therethrough, a bore defined therein in intersecting relation with said flow passage, and a spindle-receiving through hole defined therethrough in intersecting relation with said bore and having a longitudinal axis; and a spindle member disposed in said through hole for rotational movement relative to said body member about said longitudinal axis, said spindle member having a flow conduit defined therein which is aligned with said bore in one mutual rotational position of said spindle and body members to permit flow communication across said through hole in said bore, said flow conduit being misaligned with said bore in a second mutual rotational position of said spindle and body members to prevent flow communication across said through hole in said bore;

said bore terminating at one end in an opening in said body member, said flow passsage being displaced from said longitudinal axis, and said spindle-receiving through hole being positioned to intersect said bore at a location between said opening and the intersection between said bore and said flow passage, whereby flow between said opening and said flow passage is permitted across said through hole in said one mutual rotational position and is blocked by said spindle member in said second mutual rotational position;

said through hole being generally cylindrical, said spindle member being generally cylindrical to permit slidable rotation within said through hole, and said spindle member including a radially reduced section positioned axially on said spindle member so as to reside in said bore and positioned angularly on said spindle member so as to face generally toward said opening in said second rotational position of said spindle and body members and to face at an angle with respect to said opening in said one rotational position of said spindle and body members, said device further comprising a resilient insert sealing member made of resilient fluid-sealing material disposed in said opening and having an aperture extending therethrough in alignment with said bore, said insert sealing member having an outer rim portion surrounding said aperture and projecting out of said opening, said sealing insert member further including an inner end disposed in slidable fluid-sealing contact about said aperture with said spindle member, said aperture being aligned with said flow conduit in said one mutual rotational position, and wherein the inner end of said insert sealing member contacts said radially reduced section of said spindle member in said second rotational position of said spindle and body members and is urged axially outward from said opening by said spindle member in said one rotational position of said spindle and body members.

20. The fluid coupling device according to claim 19 further comprising a receiving member having a cylindrical receptacle open at one side to receive said body member, said receptacle having a generally cylindrical radially inward-facing wall defined about a further axis and along which said body member and said rim are rotational slidable, said receptacle including projection means for engaging one of said spindle and body members to prevent rotation of said one member within said receptacle, thereby permitting rotation of the other of said body and spindle members relative to said receptacle when said body member is rotated relative to said spindle member, said receiving member having a flow conductor defined therein opening into said receptacle through said radially-inward-facing wall and positioned to be aligned with said aperture in said one rotational position of said body and spindle members.

21. The fluid coupling device according to claim 20 wherein said spindle member includes two radially enlarged ends, and wherein said receptacle includes two axially spaced arms at said open one side which correspond to said projection means, said two ends being positioned to engage said two arms, respectively, to prevent mutual rotation between said spindle member and said receptacle.

22. The fluid coupling device according to claim 21 wherein said body member includes a handle portion disposed between said two enlarged ends and between said two arms to permit said handle member to be rotated with said body member through the space between said arms when said body member is rotated to said one rotational position.

23. A fluid coupling device comprising:
a body member having a flow passage defined therethrough, a bore defined therein in intersecting relation with said flow passage, and a spindle-receiving through hole defined therethrough in intersecting relation with said bore and having a longitudinal axis; and
a spindle member disposed in said through hole for rotational movement relative to said body member about said longitudinal axis, said spindle member having a flow conduit defined therein which is aligned with said bore in one mutual rotational position of said spindle and body members to permit flow communication across said through hole in said bore, said flow conduit being misaligned with said bore in a second mutual rotational position of said spindle and body members to prevent flow communication across said through hole in said bore;
said bore terminating at one end in an opening in said body member, said flow passage being displaced from said longitudinal axis, and said spindle-receiving through hole being positioned to intersect said bore at a location between said opening and the intersection between said bore and said flow passage, whereby flow between said opening and said flow passage is permitted across said through hole in said one mutual rotational position and is blocked by said spindle member in said second mutual rotational position;
further comprising a receiving member having a cylindrical receptacle open at one side to receive said body member, said receptacle having a generally cylindrical radially-inward-facing wall defined about a further axis and along which said body member and said rim are rotational slidable, said receptacle including projection means for engaging one of said spindle and body members to prevent rotation of said one member within said receptacle, thereby permitting rotation of the other of said body and spindle members relative to said receptacle when said body member is rotated relative to said spindle member, said receiving member having a flow conductor defined therein opening into said receptacle through said radially-inward-facing wall and positioned to be aligned with said aperture in said one rotational position of said body and spindle members.

24. The fluid coupling device according to claim 23 wherein said spindle member includes two radially enlarged ends, and wherein said receptacle includes two axially spaced arms at said open one side which correspond to said projection means, said two ends being positioned to engage said two arms, respectively, to prevent mutual rotation between said spindle member and said receptacle.

25. The fluid coupling device according to claim 24 wherein said body member includes a handle portion disposed between said two enlarged ends and between said two arms to permit said handle member to be rotated with said body member through the space between said arms when said body member is rotated to said one rotational position.

26. A fluid coupling device for use in conjunction with a receptacle having an inwardly-facing generally cylindrical wall defining partial enclosure which is open at one side, and a flow conductor terminating at said wall, said device comprising:
a body member having a flow passage defined therethrough, a bore defined therein in intersecting relation with said flow passage, and a spindle-receiving through hole defined therethrough in intersecting relation with said bore, said through hole having a longitudinal axis;
a spindle member disposed in said through hole for rotational movement relative to said body member about said longitudinal axis, said spindle member having a flow conduit defined therein which is aligned with said bore in one mutual rotational position of said spindle and body members to permit flow communication across said through hole in said bore, said flow conduit being misaligned with said bore in a second mutual rotational position of said spindle and body members to prevent flow communication across said through hole in said bore;
wherein said device is insertable into said receptacle through said one side such that one of said members is rotatable in said enclosure about said longitudinal axis; and
means for preventing mutual rotation between said receptacle and the other of said members;
said through hole being generally cylindrical, said spindle member being generally cylindrical to permit slidable rotation within said through hole, and said spindle member including a radially reduced section positioned axially on said spindle member so as to reside in said bore and positioned angularly on said spindle member so as to face generally toward said opening in said second rotational position of said spindle and body members and to face at an angle with respect to said opening in said one rotational position of said spindle and body members, said device further comprising a resilient insert sealing member made of resilient fluid-sealing material disposed in said opening and having an aperture extending therethrough in alignment with said bore, said insert sealing member having an outer rim portion surrounding said aperture and projecting out of said opening, said sealing insert member further including an inner end disposed in slidable fluid-sealing contact about said aperture with said spindle member, said aperture being aligned with said flow conduit in said one mutual rotational position, and wherein the inner end of said insert sealing member contacts said radially reduced section of said spindle member in said second rotational position of said spindle and body members and is urged axially outward from said opening by said spindle member in said one rotational position of said spindle and body members.

27. The fluid coupling device according to claim 26 further comprising duckbill check valve means disposed in said bore between said through hole and said flow passage to permit flow through said bore in only one direction, wherein said duckbill check valve means is oriented such that said one direction is toward said flow passage from said through hole.

* * * * *